United States Patent [19]

Bindin

[11] 4,294,897
[45] Oct. 13, 1981

[54] SEALING OF CERAMIC ELECTROLYTE TUBES IN ELECTROCHEMICAL CELLS

[75] Inventor: Peter J. Bindin, Runcorn, England

[73] Assignee: Chloride Silent Power Limited, London, England

[21] Appl. No.: 133,723

[22] Filed: Mar. 25, 1980

Related U.S. Application Data

[62] Division of Ser. No. 902,528, May 3, 1978, Pat. No. 4,215,466.

[30] Foreign Application Priority Data

May 5, 1977 [GB] United Kingdom ............. 18870/77

[51] Int. Cl.³ .............................................. H01M 2/08
[52] U.S. Cl. ..................................... 429/104; 429/174
[58] Field of Search ................................ 429/104, 174

[56] References Cited
U.S. PATENT DOCUMENTS

| 3,959,013 | 5/1976 | Breiter | 429/104 |
| 3,982,957 | 9/1976 | Jones | 429/104 |
| 4,011,367 | 3/1977 | Evans et al. | 429/104 |
| 4,170,694 | 10/1979 | Chase et al. | 429/104 |

*Primary Examiner*—Donald L. Walton
*Attorney, Agent, or Firm*—Beveridge, DeGrandi, Kline & Lunsford

[57] ABSTRACT

In an electrochemical cell such as a sodium sulphur cell using a ceramic electrolyte tube (e.g. of beta-alumina), the electrolyte tube is secured to a rigid annular element of, for example, alpha-alumina, having substantially the same coefficient of thermal expansion as the electrolyte tube, this annular element being radially thicker than the electrolyte tube and having two oppositely sloping tapered surfaces on its outer face. Metal elements are then forced onto the tapered surfaces with an interstrate layer of soft metal, e.g. aluminium, which deforms into a groove or grooves in the tapered surfaces to form a hermetic seal.

12 Claims, 1 Drawing Figure

U.S. Patent
Oct. 13, 1981
4,294,897
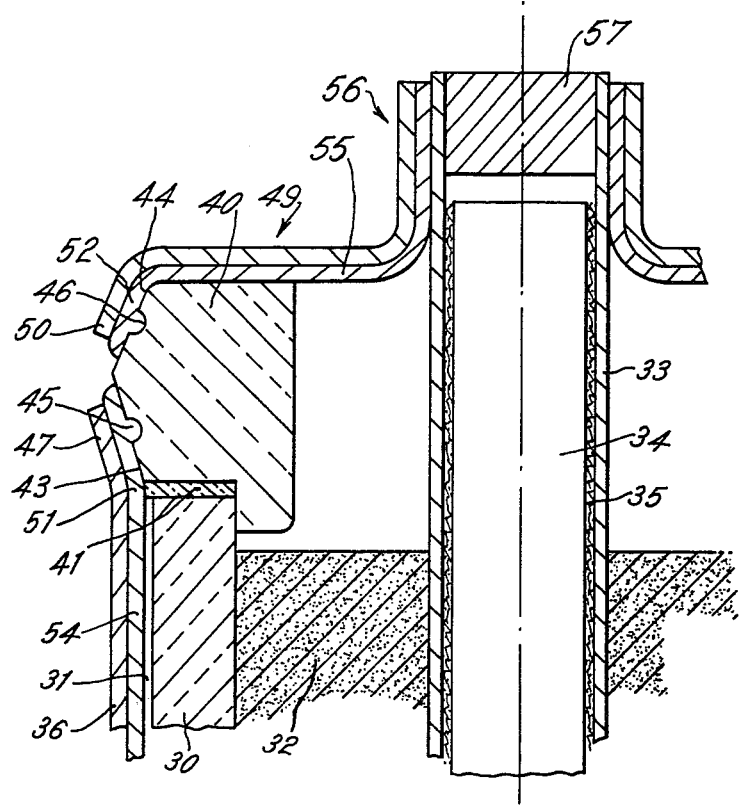

SEALING OF CERAMIC ELECTROLYTE TUBES IN ELECTROCHEMICAL CELLS

CROSS REFERENCES TO RELATED APPLICATIONS

This application is divided out of application Ser. No. 902,528 filed May 3, 1978 now U.S. Pat. No. 4,215,466.

BACKGROUND OF THE INVENTION

1. Field of the Invention

This invention relates to the sealing of ceramic electrolyte material into electrochemical cells and is concerned more particularly with the sealing of cells having tubular ceramic electrolyte material.

2. Prior Art

Sodium sulphur cells are typical examples of cells having a solid ceramic electrolyte. Such cells utilising a molten alkali metal have to operate at elevated temperatures where the electrode materials are liquid. Seals necessary to seal these electrode materials within the cells have therefore not only to withstand highly reactive materials at these elevated temperatures, but are also subjected to temperature cycling. As a typical example, a sodium sulphur cell might contain a beta-alumina electrolyte tube closed at one end and having sodium on one face of the tube, preferably the outer face, and the sulphur/polysulphides on the other face. The cell has to be sealed to prevent escape or mixing of these materials, and a number of proposals have been made for the sealing of such cells. Compared with most metals, ceramic materials are generally weak, particularly in tensile strength and it is necessary therefore in any seal for such a cell to ensure that the ceramic material is not overstressed.

It is well-known in a sodium sulphur cell to provide a beta-alumina electrolyte tube with an alpha-alumina tubular extension at its open end so that the end portion is not ionically conductive. The alpha-alumina and beta-alumina have similar coefficients of thermal expansion and the alpha-alumina extension can be secured to the beta-alumina with a glass seal. It is known to effect the sealing making use of such an alpha-alumina element. See for example U.S. Pat. Nos. 4,074,026; 3,982,959; 3,982,957 and 3,946,751.

SUMMARY OF THE INVENTION

The present invention is directed to an improved form of sealing for electrochemical cells having tubular electrolyte material providing a simple and convenient form of manufacture.

According to one aspect of the present invention, a method of sealing annular metal members to the open end of a ceramic electrolyte tube for an electrochemical cell comprises the steps of providing a rigid annular element of a ceramic material having a coefficient of expansion substantially the same as that of the electrolyte material, forming upper and lower shaped surfaces on said annular ceramic element at or near the ends thereof, the shaping being arranged so that the outside diameter decreases in the direction towards the respective end of the ceramic annular element, putting conical metal elements or coatings over the shaped surfaces, such metal elements or coatings being of a relatively soft metal compared with said annular metal members, putting said annular metal members over the respective soft metal covered upper and lower shaped surfaces of the ceramic element, and then forcing the annular metal members axially together to deform the soft metal so that said metal members are secured on the ceramic element.

With this construction, the soft metal is deformed by the axial pressure to seal the metal elements to the annular ceramic element. The metal elements, in an electrochemical cell may be closure elements for the regions inside and outside the electrolyte tube. They would typically be formed of a metal resistant to the electrochemical reactants in the cell or coated with a suitable coating. The annular ceramic element would typically be of substantially greater radial thickness than the electrolyte tube.

The annular metal elements are preferably of a material having a coefficient of thermal expansion greater than that of the ceramic material. The assembly comprising the annular element and the metal elements or coatings and the metal members may be heated either before or while forcing the metal members axially into tight engagement with the ceramic material. The material is tightly secured by the pressing on of the metal members. The heating can give a further advantage in that the metal members will contract more than the ceramic on cooling.

The shaped surfaces of the ceramic material may be tapered surfaces, for example with straight tapers, but as described later, preferably an annular groove is formed in each surface of the ceramic. The annular metal elements have conical surfaces and these may have a straight taper corresponding to the taper on the ceramic surfaces.

The metal members and the ceramic element may both be coated with the aforementioned soft material and, in this case, the securing of the elements together may be effected by pressure without heating, a cold weld being formed between the two coatings of soft material. Preferably, however, the assembly is heated either before or while the pressure is applied in this case, the soft metal may conveniently be in the form of separate elements put over the shaped ceramic surfaces before the assembly is heated and the pressure is applied.

The ceramic annular element may be secured, for example with glass, to the end of the electrolyte tube either before putting on the metal elements or after forming the assembly with the metal elements.

It will be seen that with the above-described construction, the hoop stress is taken by the annular ceramic element, which can be made quite thick in the radial direction and hence capable of withstanding the stresses which might arise.

By the above-described technique, it becomes readily possible, in a simple operation which can be automated, to secure the metal elements onto the rigid ceramic element. The metal elements can conveniently both be made of the same material and this facilitates the sealing operation because the similarly shaped surfaces with the same maximum and minimum diameters may be used and it is readily possible to obtain the same thermal conditions for effecting seals to both of the tapered surfaces since these are both external surfaces.

Preferably at least one annular groove is formed on each of said shaped surfaces of the ceramic material. The soft metal can deform into such a groove. In the region of the groove, the soft metal deforming into the groove relieves interfacial pressure and thus the provision of such a groove enables the development of interfacial pressure to be avoided except where it is needed. More generally, such a groove or grooves enables a non-linear pressure distribution to be developed across the shaped surface.

The choice of materials to be used will, in general, depend on the materials in the cell. In an electrochemical cell having a liquid alkali metal and a liquid cathodic reactant, such as for example sulphur/polysulphides, the various materials would have to be chemically inert with respect to the cell materials at the operating temperature of the cell. For a sodium sulphur cell, conveniently the ceramic annular element is formed of alpha-alumina. The soft metal interlayer may be formed of aluminium or aluminium alloy.

Very conveniently the aluminium interlayer between the hard metal and the ceramic is extended beyond the seal region, for example to form an internal protective coating protecting the outer hard metal members from contact with the anodic and cathodic reactants in the cell.

One of the two hard metal annular members may be formed integrally with an outer casing for the cell. This member, which may be formed for example of steel, would be secured on the shaped surface at that end of the ceramic element which is joined to the electrolyte tube, the casing extending from the annular portion around the outside of the electrolyte tube, which has the anodic and cathodic reactants on opposite faces. Preferably in a sodium sulphur cell, the sodium forming the anode is arranged in the region outside the electrolyte tube and the sulphur/polysulphides forming the cathodic reactant is put inside the electrolyte tube.

According to another aspect of this invention, in an electrochemical cell having a ceramic electrolyte tube closed at one end and separating anodic and cathodic reactants, an annular element of ceramic material is sealed with glass to the open end of the electrolyte tube, said annular element having shaped external surfaces such that, over these surfaces, the diameter of the element decreases from a maximum diameter intermediate the ends of the element to minimum diameters at or near the respective ends of the element, soft metal over said shaped surfaces and outer metal elements around said shaped surfaces and secured thereto by the soft metal, one of said metal elements forming part of a housing enclosing the electrolyte tube and the other of the metal elements forming a top closure extending at least partly across the top of said annular ceramic element.

BRIEF DESCRIPTION OF THE DRAWING

The accompanying drawing is part of a diagrammatic axial section illustrating the construction of a sodium sulphur cell.

DESCRIPTION OF THE PREFERRED EMBODIMENT

Referring to the drawing there is shown part of a cylindrical ceramic electrolyte tube 30 which, in this particular embodiment, is formed of beta-alumina and which serves to separate an anodic region from a cathodic region. This electrolyte tube 30 is closed at one end (the lower end in the drawing). In this embodiment the anodic region 31 containing liquid sodium is on the outside of the electrolyte tube 30. Inside this tube is the cathodic region containing, in the known way, a porous matrix of electronically-conductive material, e.g. carbon or graphite fibre 32, impregnated with the cathodic reactant, which comprises sulphur/polysulphides. Centrally within the cathodic region is a cathode current collector. This current collector comprises an outer tube 33 of electrically-conductive material, which is impermeable to the cathodic reactant and chemically and electrochemically inert to the cathodic reactant, and within the tube 33 is a conductive metal core 34 with a deformable interface material 35 between the core 34 and the tube 33. The cell has an outer steel housing 36, which extends around the outside of the anodic region 31.

The present invention is concerned more particularly with the sealing of the cell at the open end of the electrolyte tube 30. An annular element 40, which is formed of ceramic material having a coefficient of thermal expansion similar to that of the electrolyte tube 30, but which is an electronic insulator and also an ionic insulator is secured to the upper end of the electrolyte tube. Conveniently this member 40 is formed of alpha-alumina and is bonded by glass 41 to the end of the electrolyte tube. The member 40 has a radial thickness substantially greater than that of the electrolyte tube 30 so as to be capable of withstanding substantially higher radial stresses than the electrolyte tube. This member 40 is shaped on its external surface to have two tapered regions 43 and 44. The lower region 43 tapers from a maximum diameter half way up the height of the element 40 to a minimum diameter at the lower extremity. The tapered surface 44 extends over the upper half of the element 40 and is tapered in the opposite sense. The two tapers are of substantially the same angle and are linear tapers. Annular grooves 45, 46 are formed around the element 40 in respective tapered surfaces 43, 44. The outer steel housing 36, at its upper end is flared outwardly as shown at 47 to have a shape corresponding to the taper on the surface 43. A top steel closure member 49 has a downwardly-extending flange portion 50 at an angle conforming to the slope of the tapered surface 44. An interlayer 51 of a deformable metal such as aluminium or aluminium alloy is provided between the flared portion 47 of the housing and the surface 43 and a similar interlayer 52 is provided between the sloping flange portion 50 and the tapered surface 44.

Deformation seals are made between the outer housing 36 and the element 40 and between the top closure 49 and the element 40 by loading the closure member 49 in the direction of the axis of the assembly against a reactive load on the housing 36. This loading is effected at an elevated temperature above the normal working temperature of the cell (which might typically be 350° C.); preferably the seal is effected at a temperature of about 600° C. The loading causes the interlayers 51, 52 to be extensively deformed during relative movement between the housing 36 and the closure 49. This extensive deformation breaks up the oxide surface layer on the material of the interlayers and exposes the pure metal surface. Deformation can also scrub oxide layers from the inner surfaces of the housing and the top closure member where they extend over the tapered surfaces. The freshly exposed metal of the interlayers bonds strongly to the metal housing 36 and the top closure member 49 and also to the alpha-alumina element 40 so that all three are sealed and bonded together.

The grooves 45, 46 reduce the area of contact of the tapered surface and thus increase the compressive stress on the interlayer and thereby cause increased deformation. These grooves provide a region into which material from the deformed interlayers is able to flow. This reduces the interfacial pressure in the immediate region of the grooves and hence causes, for any given axial loading of the assembly, increased interfacial pressure in other parts remote from the groove. It thereby increases the amount of deformation that is able to occur at a given stress level. The provision of such a groove or grooves enables a non-linear pressure distribution to be obtained with the maximum stress occurring in chosen areas.

The interlayers 51, 52 of soft deformable metal might be coatings bonded to one or both of the tapered surfaces but, as illustrated in the drawing, are preferably separate elements which conveniently extend beyond the region of the seal to perform further functions. The lower interlayer 51 extends down inside the housing 36 to form a protective barrier 54. The anodic region 31 between this barrier 54 and the electrolyte tube 30 is formed as a capillary region or contains a sodium electrode capillary feeder means so that the outer surface of the electrolyte tube 30 can be kept wet with liquid sodium from a sodium reservoir. Such an interlayer member 51, 54 may conveniently be formed as a deep drawn tube of aluminium or aluminium alloy with a hemispherical closed lower end. Suitable small holes or fissures may be formed in this layer at appropriate locations to allow a restricted feed of sodium metal from the sodium reservoir. In a cell having a cylindrical casing, the sodium is conveniently stored in a reservoir (not shown) beyond the closed end of the ceramic electrolyte tube 30. In a cell with a square section housing, the sodium may be stored between the outer surface of the electrolyte tube and the inner surface of the outer casing. In such a cell, the housing 36 may be of substantially square cross section over the greater part of its length with a short transformation region from the square cross section to a round cross section at the upper end where the housing is formed with a flared portion 47 of conical form, which is sealed to the alpha-alumina element 40.

The upper interlayer 52 extends across the top of the alpha-alumina element 40 across the top of the cell to the current collector as a protective lining 55 inside the closure member to give protection against corrosion by the cathodic reactants during operation of the cell. This interlayer 52, 55 is conveniently also used as an interlayer for a deformation seal 56 between the closure member and the outer tube 33 of the current collector this current collector is provided with an internal closure 57 through which electrical connection between the current collector and an external terminal is effected.

In the above-described method of effecting the closure, the assembly is heated. It is possible to use cold friction welds if aluminium is coated onto the tapered surfaces of the alumina element and the outer metal components. A cold weld enables a faster process time to be obtained for the welding operation. The required plating of the aluminium onto the alumina and the metal components may conveniently be effected using an ion plating technique to ensure firm bonding of the aluminium coating onto the components. The cold welding technique furthermore would enable the cell to be sealed with the sulphur electrode in place. On the other hand a process in which the load is applied while the assembly is heated and in which the outer metal elements must shrink onto the alpha-alumina element when the assembly cools ensures high interfacial pressure with a smaller loading in the assembly.

I claim:

1. An electrochemical cell having a ceramic electrolyte tube closed at one end and separating anodic and cathodic reactants, wherein an annular element of ceramic material is sealed with glass to the open end of the electrolyte tube, said annular element having shaped external surfaces such that, over these surfaces, the diameter of the element decreases from a maximum diameter intermediate the ends of the element to minimum diameters at or near the respective ends of the element, soft metal over said shaped surfaces and outer metal elements around said shaped surfaces and secured thereto by the soft metal, one of said metal elements forming part of a housing enclosing the electrolyte tube and the other of the metal elements forming a top closure extending at least partly across the top of said annular ceramic element.

2. A cell as claimed in claim 1, and having at least one annular groove in each of said shaped surfaces of the annular element.

3. A cell as claimed in claim 1 wherein the electrolyte tube is a beta-alumina tube, wherein the annular element is formed of alpha-alumina and wherein said soft metal is aluminium.

4. A cell as claimed in claim 3 wherein the aluminium extends beyond the annular ceramic element to form a protective layer over the surface of at least one of said outer metal elements.

5. A cell as claimed in claim 4 wherein one of said outer metal elements forms a closure for said electrolyte tube.

6. A cell as claimed in claim 5 wherein the other of said outer metal elements forms a housing for said ceramic electrolyte tube enclosing a reactant zone around the outside of the electrolyte tube.

7. An electrochemical cell having a cylindrical housing, a ceramic electrolyte tube located in said housing, said electrolyte tube being closed at one end and separating anodic and cathodic regions, one of which regions lies within the electrolyte tube and the other in the annular space between the tube and the housing, an annular element of ceramic material secured by a glass seal to the open end of the electrolyte tube, said annular element having two tapered external surfaces such that, over these surfaces, the diameter of the element decreases from a maximum diameter intermediate the ends of the element to minimum diameters at or near the respective ends of the element, soft metal constituting an interlayer over each of said tapered surfaces and two outer metal elements respectively around said two tapered surfaces and secured thereto by the soft metal, one of said metal elements being secured to said housing enclosing the electrolyte tube to constitute a closure for the annular region between the tube and the housing and the other of the metal elements forming a top closure for said tube and extending at least partly across the top of said annular ceramic element.

8. A cell as claimed in claim 7 and having at least one annular groove in each of said shaped surfaces of the annular element.

9. A cell as claimed in claim 7 wherein the electrolyte tube is a beta-alumina tube, wherein the annular element is formed of alpha-alumina and wherein said soft metal is aluminium.

10. A cell as claimed in claim 7 wherein the aluminium extends beyond the annular ceramic element to form a protective layer over the surface of at least one of said outer metal elements.

11. An electrochemical cell having a housing, a ceramic electrolyte tube closed at one end and located in said housing, a rigid annular element secured to the open end of the electrolyte tube and formed of a ceramic having a coefficient of expansion substantially the same as that of the electrolyte material, said annular ceramic element having a cylindrical interior surface and a shaped outer surface, which outer surface comprises two oppositely tapered conical portions, which are at or near the respective ends of the annular ceramic element, the conical portions being axially aligned and having equal and opposite tapers such that the outside diameter of the annular ceramic element decreases in a direction towards the respective ends of the annular ceramic element, the annular ceramic element being sealed around the electrolyte tube at the open end thereof, two annular metal members of a material having a coefficient of thermal expansion greater than that of the ceramic material, conical metal elements or coatings over the conical surfaces on the annular ceramic element, such metal elements or coatings being of relatively soft material compared with said annular metal members, said annular metal members being over the respective soft metal covered upper and lower tapered surfaces of the annular ceramic element, the annular metal members having internal tapers corresponding to the external tapers on the annular ceramic element, the annular metal members being bonded to the annular ceramic element by deformation of the soft metal between the annular metal members and the annular ceramic element, one of the annular metal members being secured to said housing to form a closure for the region between the annular ceramic element and the housing and the other of the annular members extending at least partly across the open end of the electrolyte tube to form at least part of a closure for that tube.

12. An electrochemical cell as claimed in claim 11 and having at least one annular groove in each of said tapered conical portions of said annular ceramic element.

* * * * *